(12) United States Patent
Aliseo

(10) Patent No.: US 7,434,820 B1
(45) Date of Patent: Oct. 14, 2008

(54) YARN STORAGE APPARATUS

(76) Inventor: Nicole Aliseo, 35 Jerome Dr., Farmingdale, NY (US) 11735

( * ) Notice: Subject to any disclaimer, the term of this patent is extended or adjusted under 35 U.S.C. 154(b) by 85 days.

(21) Appl. No.: 11/559,989

(22) Filed: Nov. 15, 2006

(51) Int. Cl.
*B62B 3/10* (2006.01)
(52) U.S. Cl. .................. 280/47.35; 280/79.3; 211/85.5
(58) Field of Classification Search ............. 280/47.19, 280/47.35, 79.3, 79.11; 211/85.5
See application file for complete search history.

(56) References Cited

U.S. PATENT DOCUMENTS

| | | | | |
|---|---|---|---|---|
| 2,823,842 | A * | 2/1958 | Huff ............................ | 223/107 |
| 3,876,161 | A | 4/1975 | Miller | |
| 3,937,414 | A * | 2/1976 | Bank et al. ................... | 242/557 |
| 3,946,884 | A * | 3/1976 | Kato et al. ................... | 414/800 |
| 3,966,221 | A * | 6/1976 | Beam et al. ................. | 280/79.3 |
| D246,785 | S | 12/1977 | Abe et al. | |
| 4,245,794 | A | 1/1981 | Hasegawa et al. | |
| 4,457,527 | A * | 7/1984 | Lowery .................... | 280/47.19 |
| 4,564,152 | A * | 1/1986 | Herriage .................. | 242/422.4 |
| 5,275,349 | A * | 1/1994 | Tussing ....................... | 242/557 |
| 5,308,012 | A * | 5/1994 | Fuller .......................... | 242/557 |
| 5,577,745 | A * | 11/1996 | Birk ......................... | 280/47.19 |
| 5,975,458 | A * | 11/1999 | Goldthreate ................ | 242/603 |
| 6,059,220 | A * | 5/2000 | Lassiter ....................... | 242/557 |
| 6,116,533 | A * | 9/2000 | Elder ....................... | 242/594.4 |
| 6,170,672 | B1 * | 1/2001 | Boettcher .................. | 211/13.1 |
| 6,270,094 | B1 * | 8/2001 | Campbell ................ | 280/47.19 |
| 6,422,504 | B1 * | 7/2002 | Elder ....................... | 242/594.6 |
| 6,523,776 | B1 * | 2/2003 | Elder ....................... | 242/594.4 |
| 6,561,528 | B2 * | 5/2003 | Bootsman ................ | 280/47.26 |
| 6,843,488 | B1 * | 1/2005 | Tseng ...................... | 280/47.35 |
| 7,124,980 | B2 * | 10/2006 | Giovannoni ................ | 242/557 |

* cited by examiner

*Primary Examiner*—Jeffrey J Restifo

(57) ABSTRACT

A yarn storage apparatus that is portable, capable of winding and storing a plurality of yarns, and also capable of storing other items is disclosed. The apparatus is supported on two inverted U-shaped legs, each having omnidirectional casters. A plurality of removable and interchangeable spools are disposed between the legs. Each spool is motor driven in a choice of "wind", "stop", and "neutral" positions. Each spool is provided with non-slip coating and yarn orifice and yarn clamp, which can be selectively retained in open or closed position.

7 Claims, 4 Drawing Sheets

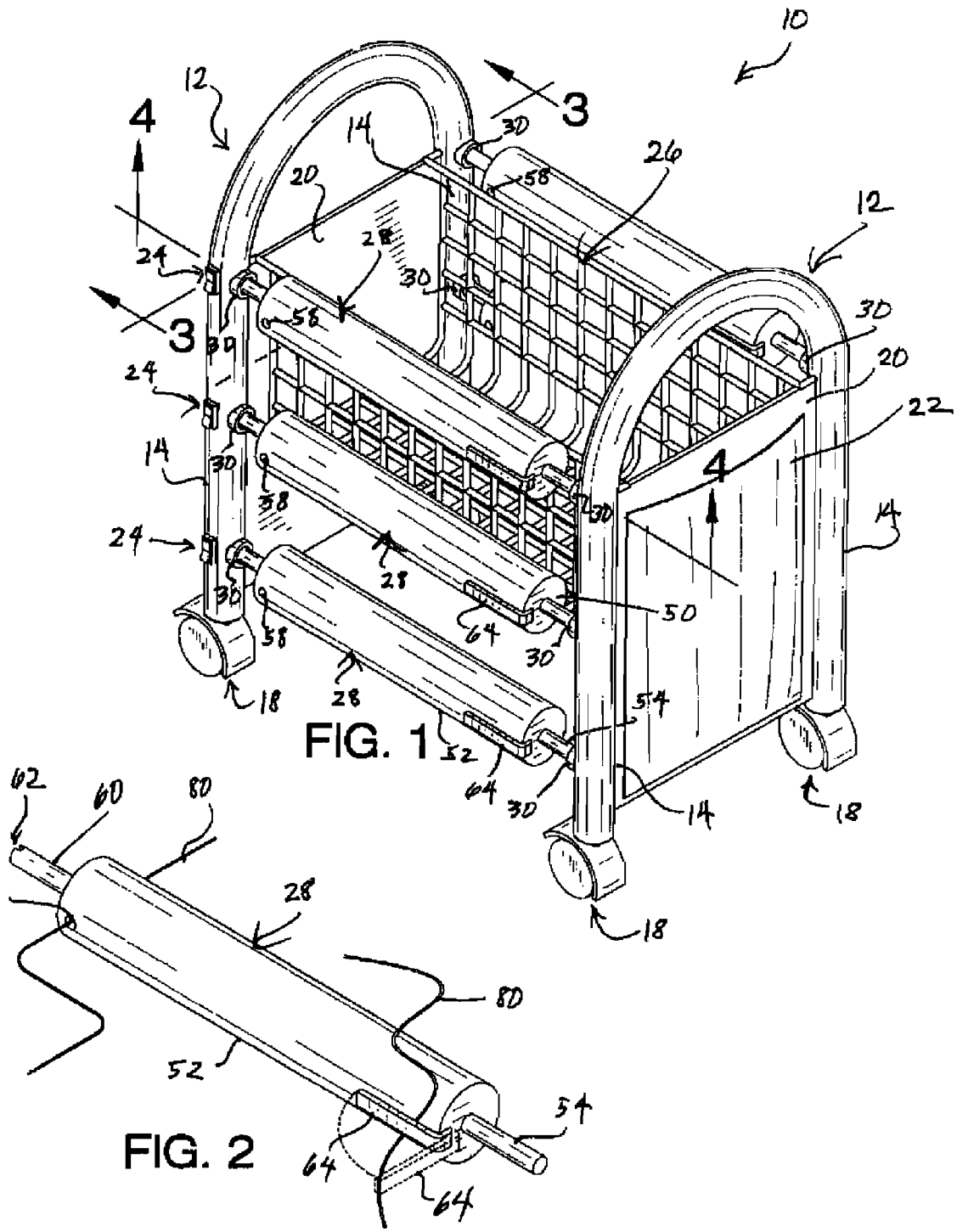

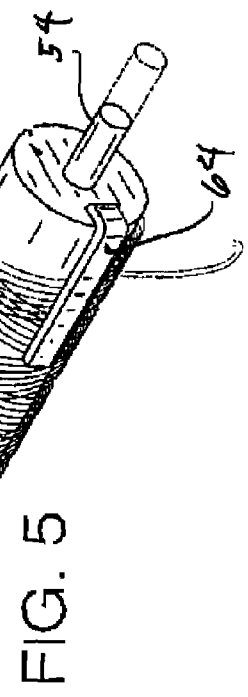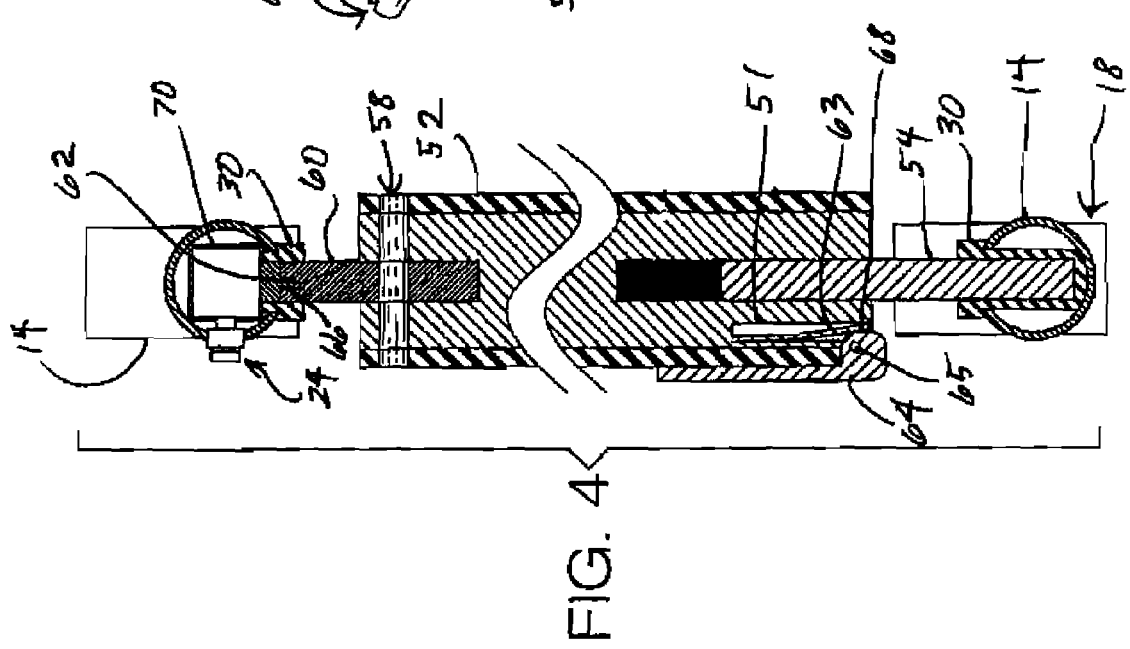

YARN STORAGE APPARATUS

BACKGROUND OF THE INVENTION

Hobbyists who work with yarn, various thread, and the like in knitting, crocheting and a multitude of other crafts, are constantly in need or organizational tools and tools for correctly holding their craft items. Storing and holding yarns is a primary concern. Without a means to hold yarns, spools are often lost, tangled, soiled, and generally distracting in such ways as to produce aggravation and lack of production in the chosen task. What is needed is a convenient and portable means winding and storing yarn and other crafts related items. The ideal apparatus provides for multiple spool yarn storage, along with selective electric drive of the spools.

1. Field of the Invention

The yarn storage apparatus relates to handling yarn and more especially to a yarn storage apparatus that is portable, capable of winding and storing a plurality of yarns, and also capable of storing other items.

2. Description of the Prior Art

The prior art is replete with devices for controlling yarn winding, especially suited to industrial concerns and use. The devices do not provide the functions of the present apparatus. Prior related art U.S. Pat. No. 424,594 issued to Hasegawa et al. on Jan. 20, 1981 teaches a yarn winding apparatus that is used in industrial applications wherein yarn tension is of concern. The apparatus does not serve the needs of the current yarn storage apparatus. U.S. Pat. No. 386,161 issued to Miller on Apr. 8, 1975 teaches an automatic yarn transfer system which transfers yarn from one chuck to another. The system does not perform the tasks of the present yarn storage apparatus. U.S. Pat. No. D246,785 issued to Abe et al. on Dec. 27, 1977 teaches a winder for synthetic filament yarn. The device cannot perform the functions of the present apparatus.

While the above-described devices fulfill their respective and particular objects and requirements, they do not describe a yarn storage apparatus that provides for the advantages of the yarn storage apparatus. In this respect, the yarn present storage apparatus substantially departs from the conventional concepts and designs of the prior art. Therefore, a need exists for an improved yarn storage apparatus.

SUMMARY OF THE INVENTION

The general purpose of the present yarn storage apparatus, described subsequently in greater detail, is to provide a yarn storage apparatus which has many novel features that result in an improved yarn storage apparatus which is not anticipated, rendered obvious, suggested, or even implied by prior art, either alone or in combination thereof.

To attain this, the yarn storage apparatus comprises a portable stand with four omnidirectional casters. Each side of the apparatus comprises three spools for yarn storage and removal. The basket is disposed between the spools. Basket end plates assist in containing various items kept in the basket, as does the mesh design of the basket. The mesh provides for easy viewing of items held in the basket. The apparatus is used by those enjoying knitting, crocheting and other crafts which involve yarns of various descriptions. The apparatus prevents yarn entanglement, soiling, loss, and other such problems experienced by the hobbyist.

The switch for each motor controlled spool is disposed proximal to the associated spool. Each switch provides for wind, stop, and neutral. Neutral provides for manual rotation of each spool. Each spool comprises a spring-tensioned clasp. Each clasp can retain the end of yarn as needed.

The apparatus is provided in more than one embodiment. One embodiment does not provide motorized control of the spools. Another embodiment of the apparatus provides for electric spool motors. Yet another embodiment provides battery power for the spool motors.

Thus has been broadly outlined the more important features of the improved yarn storage apparatus so that the detailed description thereof that follows may be better understood and in order that the present contribution to the art may be better appreciated.

An object of the yarn storage apparatus is to provide a yarn and associated equipment tool for the hobbyist.

Another object of the yarn storage apparatus is to provide yarn storage.

It is also an object of the yarn storage apparatus to provide for storage of other items.

A further object of the yarn storage apparatus is to provide easy winding and dispensing of yarn.

And, too, an object of the yarn storage apparatus is to provide for motorized yarn winding.

An added object of the yarn storage apparatus is to prevent yarn entanglement.

And, an object of the yarn storage apparatus is to provide apparatus portability.

Further, an object of the yarn storage apparatus is to provide for easy set up and use.

Additionally, an object of the yarn storage apparatus is to provide for rapid knitting.

These together with additional objects, features and advantages of the improved yarn storage apparatus will be readily apparent to those of ordinary skill in the art upon reading the following detailed description of presently preferred, but nonetheless illustrative, embodiments of the improved yarn storage apparatus when taken in conjunction with the accompanying drawings.

In this respect, before explaining the current embodiments of the improved yarn storage apparatus in detail, it is to be understood that the yarn storage apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved yarn storage apparatus. It is therefore important that the claims be regarded as including such equivalent constructions insofar as they do not depart from the spirit and scope of the yarn storage apparatus. It is also to be understood that the phraseology and terminology employed herein are for purposes of description and should not be regarded as limiting.

BRIEF DESCRIPTION OF THE DRAWINGS

FIG. 1 is a perspective view of the apparatus.

FIG. 2 is a perspective view of one spool of the apparatus.

FIG. 4 is a partial cross sectional view of FIG. 1.

FIG. 5 is a perspective view of a spool containing wound yarn.

DETAILED DESCRIPTION OF THE DRAWINGS

With reference now to the drawings, and in particular FIGS. 1 through 6 thereof, the principles and concepts of the yarn storage apparatus generally designated by the reference number 10 will be described.

Figure 3:
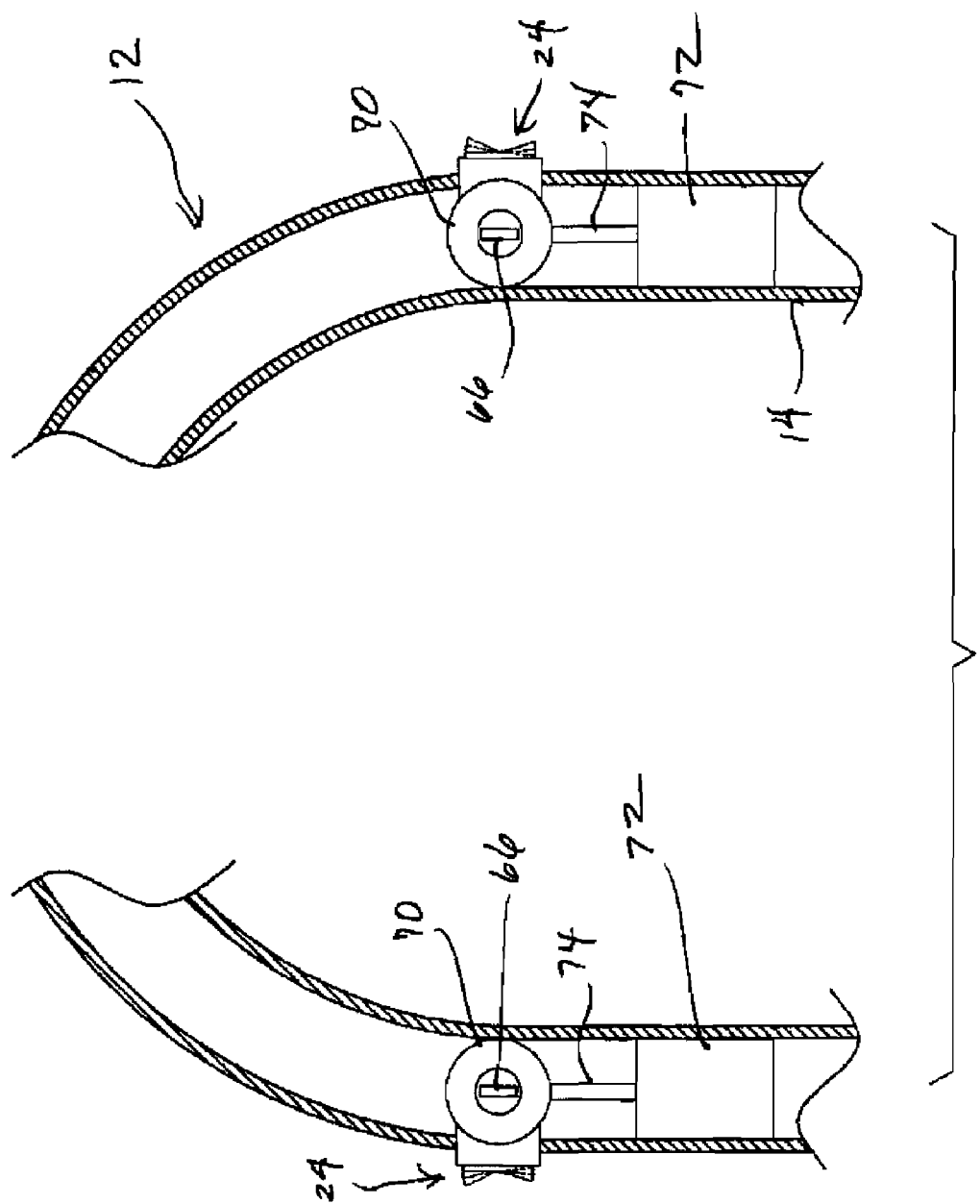
FIG. 3 is a partial cross sectional view of FIG. 1.
Figure 6:
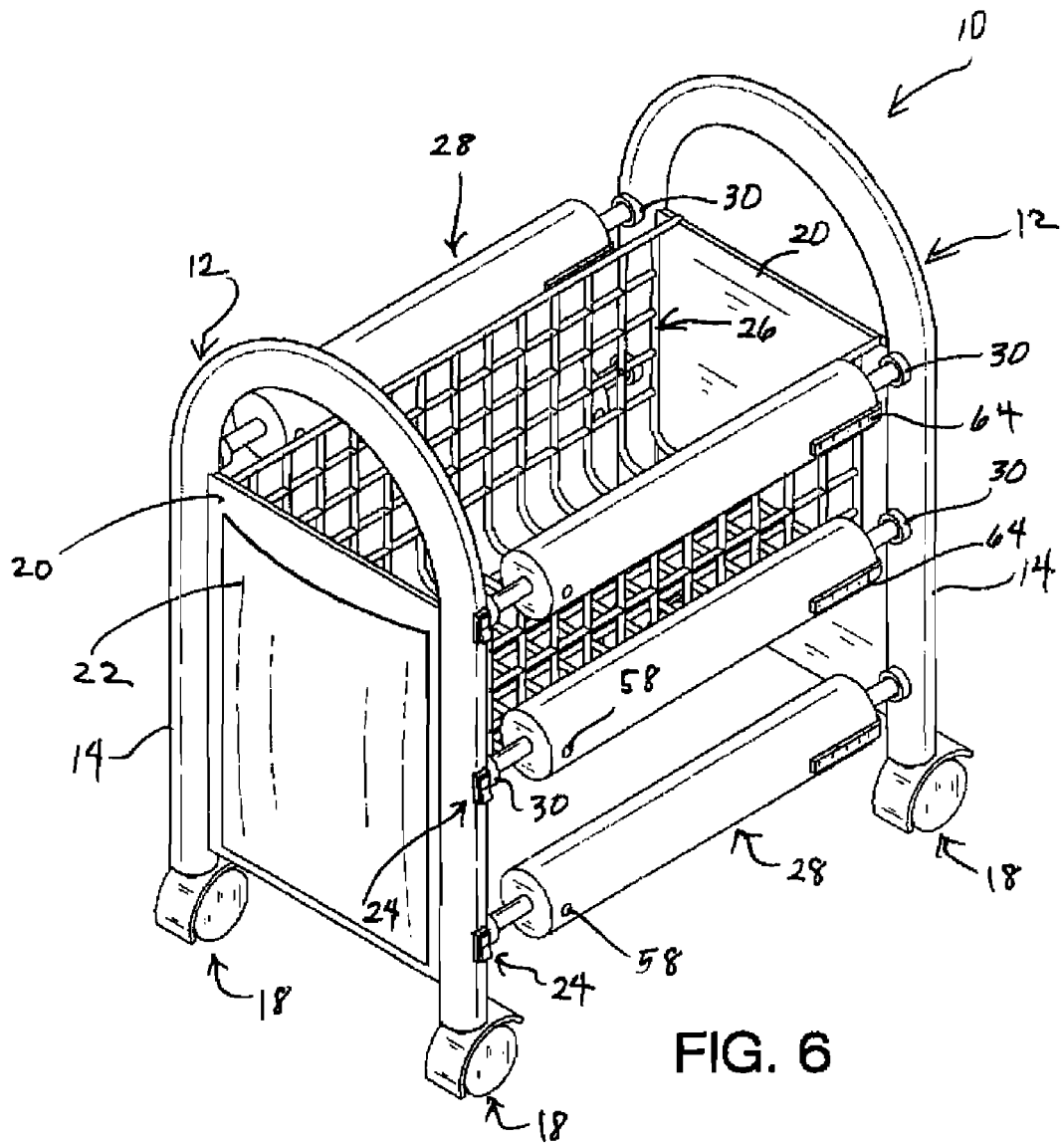
FIG. 6 is a perspective view of the apparatus, from a side opposite that of FIG. 1.

Referring to FIGS. 1 and 6, the yarn storage apparatus 10 comprises a pair of spaced apart inverted U legs 12. Each U leg 12 is partially comprised of a pair of spaced apart vertical leg segments 14 on each U leg 12. The basket 26 is disposed between the U legs 12. An end plate 20 is disposed at an each end of the basket 26. Each end plate 20 is disposed between the vertical leg segments 14 of one of the U legs 12. A pouch is disposed on an outside of each end plate 20. A plurality of bushings 30 is disposed in each vertical leg segment 14. An omnidirectional caster 18 is disposed on the bottom of each vertical leg segment 14. The mesh basket 26 provides for viewing of items held within.

Viewing FIGS. 2, 3, 4, and 6, a plurality of electric motors 70 is disposed in one vertical leg segment 12 of each U leg 12, one motor 70 for each bushing 30 in that leg segment 14. The drive notch 62 is disposed on each motor 70. A switch 24 is provided for controlling each motor 70. Each switch 24 is disposed proximal to the corresponding motor 70. The power source provided for the illustrated electric motors are batteries 72 disposed within the vertical leg segments 14 proximal to each motor 70 and switch 24. Each batter 72 is connected to a motor 70 via an electrical connection 74. A plurality of electrically rotated spools 28 are horizontally and removably held within the bushings 30 and between the pair of U legs 12.

Referring to FIGS. 4 and 5, each spool 28 comprises a first end, a second end, and a length therebetween. A non-slip outer coating 52 is disposed on each spool 28. The drive shaft 60 is disposed within the first end of each spool 28. A notch 62 is disposed in an outer end of the each drive shaft 60. The yarn orifice 58 is disposed through the spool 28 and the drive shaft 60. The piston 54 is slideably disposed within a center of the second end of the spool 28. A longitudinal spring orifice 51 is disposed within the second end of the spool 28. The flat spring 63 is contained within the spring orifice 51. The clamp pivot 65 is disposed immediately proximal to the spring orifice 51.

The yarn clamp 64 is rotatably held on the clamp pivot 65. The clamp cam 68 is disposed on the clamp 64. The cam 68 temporarily holds the clamp 64 in a predetermined position. The clamp cam 68 holds the yarn clamp 64 in an open position, when on one flat side of the cam 68. The clamp cam 68 holds the yarn clamp 64 in a closed position when on the other flat side of the cam 68. The clamp cam 68 thereby selectively retains yarn 80, as chosen by a user. Each three-position switch 24 comprises positions for wind, stop, and neutral.

As example of use, a yarn 80 end is inserted through the yarn orifice 58 in one end of a given spool 28. The user engages the corresponding switch 24 in the "wind" position (not shown). Yarn 80 winds onto the non-slip coating 52 of the spool 28. The user guides the winding process as desired. When winding is completed, the user disengages the switch 24. The clamp 68 is used to hold the opposite end of the yarn 80. The "stop" position (not shown) of each switch locks the motor 70 and hence the associated spool 28 against rotational movement. To extract yarn 80 from a given spool 28, a user unclasps the yarn 80 from the given spool 28 clamp 64 by flexing the clamp 64 outwardly. The user engages the "neutral" position of the associated switch 24 as desired to allow the spool 28 to freewheel in release of yarn 80. Spools 28 are located as desired, with respect to the various pairs of bushings 30 in the opposed U legs 12.

With respect to the above description then, it is to be realized that the optimum dimensional relationships for the parts of the yarn storage apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the yarn storage apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the yarn storage apparatus may be used.

Therefore, the foregoing is considered as illustrative only of the principles of the yarn storage apparatus. Further, since numerous modifications and changes will readily occur to those skilled in the art, it is not desired to limit the yarn storage apparatus to the exact construction and operation shown and described, and accordingly, all suitable modifications and equivalents may be resorted to, falling within the scope of the yarn storage apparatus.

What is claimed is:

1. A yarn storage apparatus, comprising:
   a pair of spaced apart inverted U legs;
   a pair of spaced apart vertical leg segments on each U leg;
   a basket disposed between the U legs;
   an end plate at an each end of the basket, each end plate disposed between the vertical leg segments of one of the U legs;
   a plurality of bushings in each vertical leg segment;
   a plurality of electric motors disposed in one vertical leg segment of each U leg, one motor for each bushing;
   a drive notch disposed on each motor;
   a switch for controlling each motor, each switch disposed proximal to the motor;
   a power source for the electric motors;
   a plurality of electrically rotated spools horizontally and removably held within the bushings and between the pair of U legs, each spool comprising:
   a first end, a second end, and a length therebetween;
   a non-slip outer coating;
   a drive shaft within the first end;
   a notch in an outer end of the drive shaft;
   a yarn orifice through the spool and the drive shaft;
   a piston slideably disposed within a center of the second end;
   a longitudinal spring orifice within the second end;
   a flat spring contained within the spring orifice;
   a clamp pivot immediately proximal to the spring orifice;
   a yarn clamp rotatably held on the clamp pivot;
   a clamp cam on the clamp, the cam for temporarily holding the clamp in a predetermined position.

2. The apparatus in claim 1 wherein each switch comprises positions for wind, stop, and neutral.

3. The apparatus in claim 2 wherein a caster is disposed on a bottom of each vertical leg segment.

4. The apparatus in claim 3 wherein a pouch is disposed on an outside of each end plate.

5. The apparatus in claim 2 wherein a pouch is disposed on an outside of each end plate.

6. The apparatus in claim 1 wherein a caster is disposed on a bottom of each vertical leg segment.

7. The apparatus in claim 6 wherein a pouch is disposed on an outside of each end plate.

* * * * *